United States Patent [19]

Hirose

[11] Patent Number: 4,511,223
[45] Date of Patent: Apr. 16, 1985

[54] TELECENTRIC VARIABLE POWER ILLUMINATION SYSTEM

[75] Inventor: Hideo Hirose, Kawaguchi, Japan

[73] Assignee: Nippon Kogaku K.K., Tokyo, Japan

[21] Appl. No.: 388,200

[22] Filed: Jun. 14, 1982

[30] Foreign Application Priority Data

Jun. 19, 1981 [JP] Japan .................................. 56-93729

[51] Int. Cl.³ ............................................. G02B 21/06
[52] U.S. Cl. ..................................... 350/523; 350/519
[58] Field of Search ............... 350/415, 519, 523, 524, 350/526

[56] References Cited

U.S. PATENT DOCUMENTS

| 1,236,722 | 8/1917 | Lange | 350/559 |
| 3,549,230 | 12/1970 | Kato et al. | 350/519 |
| 3,637,282 | 1/1972 | Hayamizu | 350/415 |
| 4,386,828 | 6/1983 | Hirose | 350/519 |

Primary Examiner—John K. Corbin
Assistant Examiner—Lynn Vandenburgh Kent
Attorney, Agent, or Firm—Shapiro and Shapiro

[57] ABSTRACT

A variable power telecentric illumination system comprises a first converging lens group, a second converging lens group, a third diverging lens group and a fourth converging lens group arranged in this ordinal sequence as viewed in the direction toward the object side to be illuminated from the light source side. The second and third groups are interchangeable in position. An image of the light source by the composite system of the first and second groups is formed between the second and the third groups. The focal point on the light source side of the composite system of the third and fourth groups is coincident with the light source image. When the positions of the second and third groups are interchanged, the composite system of the first and third groups forms an image of the light source between the second and third groups. The focal point on the light source side of the composite system of the second and fourth groups is coincident with the light source image. The illuminated area on the object surface is changed by the interchange of positions between the second and third groups while maintaining the condition of telecentric illumination.

10 Claims, 10 Drawing Figures

TELECENTRIC VARIABLE POWER ILLUMINATION SYSTEM

BACKGROUND OF THE INVENTION

1. Field of the Invention

The present invention relates to a telecentric illumination system. More particularly, the present invention is directed to improvements in such illumination system, and in which the illuminated area can be changed.

2. Description of the Prior Art

Telecentric illumination has been used, for example, for the illumination system in a measuring projector or the like. The purpose for which the telecentric illumination is employed is to minimize the effect of focusing error on measurement. For projection examination it is desired to obtain a clear and bright projected image irrespective of magnification used. To meet the desire, there have been proposed various variable power illumination systems which enable changing the illuminated area according to the change of magnificaton of the objective lens. FIG. 1 illustrates an example of the simple illumination area changeover system according to the prior art. FIG. 1A and 1B show two different states of illumination by use of an illumination system comprising a positive and a negative lens. The state of illumination shown in FIG. 1A is for a lower magnification and that shown in FIG. 1B is for a higher magnification. At the higher magnification, the illuminated area becomes narrower than that at the lower magnification. As will be described hereinafter, the known illumination system has the drawback that when the magnification is changed from a lower magnification as shown in FIG. 1A to a higher magnification as shown in FIG. 1B, the marginal rays become unusable for illuminating the narrower area and therefore the efficiency of the illumination often drops down. This will be described in detail with reference to FIGS. 1A and 1B.

In FIGS. 1A and 1B, the sample surface to be illuminated is indicated by O. Dotted lines indicate oblique rays.

In the case of FIG. 1A for a lower magnification, the composite focal length is relatively long, and therefore the beam diameter is relatively large. The angle which the oblique rays form with the optical axis of the illumination system is small. Under this state of illumination, the quantity of marginal light incident on the sample surface (O) is sufficient.

In the case of FIG. 1B for a higher magnification, however, the composite focal length is relatively short and therefore the beam diameter is small. Consequently, the angle which the oblique rays form with the optical axis becomes larger as compared with FIG. 1A. A large part of the oblique rays misses the sample surface (O). The efficiency of illumination decreases accordingly. This is the most important drawback of the shown illumination system according to the prior art.

As a solution to the above problem of poor illumination at high magnification, condensing illumination has been employed in many apparatus, but only for want of a better technique. However, when condensing illumination is employed in an illumination system, the illumination system can no longer maintain the conditions for telecentric illumination. Such illumination system can not be satisfactorily used as an illumination system for a measuring instrument or other similar apparatus for which extremely high accuracy is required.

The known illumination system also has a problem in measuring a cylindrical object. When a cylindrical object is illuminated by the above known illumination system, there is produced a partial shadow due to the effect of the illumination aperture. In this case, the geometric boundary of the measured object and the optical boundary can not exactly coincide with each other, so that a measuring error is caused. To minimize such error, the illumination must be done through an aperture properly adjusted relative to the diameter of the measured object in accordance with the well-known Günther's formula. "Die Microskopische Abbildung von Zylindern and Gewinden" appearing on pages 315-321 of Zeitschrift fur Instrumentekund, August 1939. However, in the conventional changeover type simple illumination systems that may be employed in a measuring projector and other similar measuring apparatus, it is generally difficult to incorporate into the system a telecentric stop (aperture stop) for controlling the aperture.

SUMMARY OF THE INVENTION

Accordingly, it is a general object of the present invention to overcome the drawbacks of the prior art illumination systems mentioned above.

It is a more specific object of the invention to provide a variable power telecentric illumination system which is simple in construction and assures good efficiency of illumination even when the magnification is changed.

It is another object of the invention to provide such telecentric illumination system which is simple in construction and in which a telecentric stop can be incorporated.

To attain the above objects, the variable power telecentric illumination system according to the invention comprises a first converging lens group, a second converging lens group, a third diverging lens group and a fourth converging lens group arranged in this ordinal sequence as viewed in the direction toward the object side to be illuminated from the light source side. The second and third groups are interchangeable in position. An image of the light source by the composite system of the first and second groups is formed between the second and third groups. The focal point on the light source side of the composite system of the third and fourth groups is coincident with the light source image. When the positions of the second and third groups are interchanged, the composite system of the first and third groups forms an image of the light source between the second and third groups. The focal point on the light source side of the composite system of the second and fourth groups is coincident with the light source image. The illuminated area on the object surface is changed by the interchange of positions between the second and third groups while maintaining the condition of telecentric illumination.

More concretely, the four groups lens units are arranged in the following manner.

The first group forms an image of the light source at the middle point between the second and third groups. The focal point on the light source side of the fourth group lies just at the middle point between the second and third groups. When the second group is at the position on the side of the first group, the image point given by the second group regarding the middle point between the second and third groups as the object point of the second group becomes the object point of the third group. In other words, the image point of the light source by the composite system of the first and second groups becomes the object point of the third group. The image point of this object point by the third group is coincident with the above middle point. When the third group is at the position on the side of the first group, the image point given by the third group whose object point is the middle point between the second and third groups becomes the object point of the second group. In other words, the image point of the light source by the composite system of the first and third groups becomes the object point of the second group. The image point of this object point by the second group is coincident with the above middle point.

With this arrangement of the four groups, when a broader area is to be illuminated at a lower magnification, the composite focal length of the lens groups between the light source image and the illuminated object can be made longer by locating the converging second group on the side of the first group and the diverging third group on the side of the fourth group. On the contrary, when it is wished to illuminate a narrower area at higher magnification, the composite focal length of the lens groups between the light source image and the illuminated object can be made shorter by locating the diverging third group on the side of the first group and the converging second group on the side of the fourth group while increasing the magnification of the light source image and narrowing the illuminated area as compared with the state of illumination at the above lower magnification.

In this manner, according to the invention the change of the illuminated area can be attained by the interchange of positions between the second and third groups while maintaining the conjugated relation to the light source.

Other and further objects, features and advantages of the invention will appear more fully from the description of preferred embodiments taken in connection with the accompanying drawigs.

DETAILED DESCRIPTION OF PREFERRED EMBODIMENTS

Figure 1A:
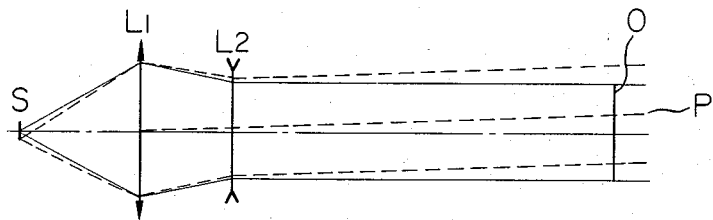
FIGS. 1A and 1B illustrate an illumination system according to the prior art showing the state of illumination at a lower magnification and at a higher magnification, respectively.
Figure 1B:
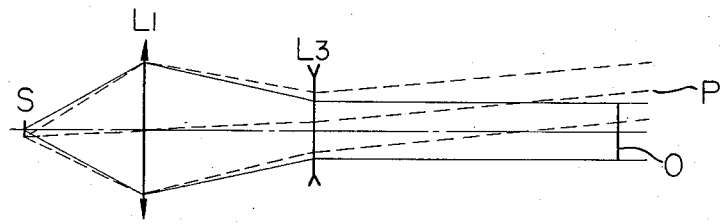
Figure 2A:
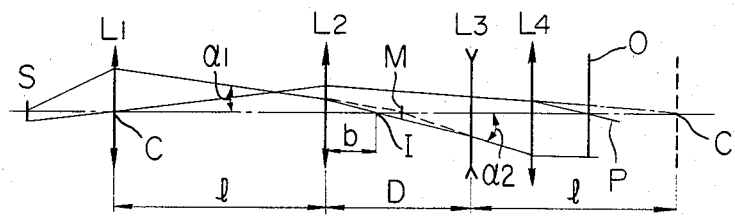
FIGS. 2A, 2B, 3A, 3B, 4A and 4B show various basic arrangements of the illumination system according to the invention in which A is for low magnification and B is for high magnification throughout all of the figures.
Figure 2B:
Figure 2B:
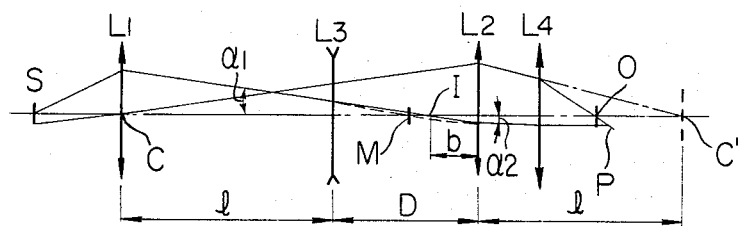

A basic arrangement of the illumination system according to the invention is shown in FIGS. 2A and 2B in two different positions, namely the position for low magnification 2A and the position for high magnification 2B.

For illumination at a low magnification, as shown in FIG. 2A, the illumination system is composed of a converging first group $L_1$, a converging second group $L_2$, a diverging third group $L_3$ and a converging fourth group $L_4$ arranged in sequence as viewed from the side of a light source S. The second and third groups $L_2$ and $L_3$ are interchangeable in position. By interchanging the positions of the second and third groups as shown in FIG. 2B there is obtained the arrangement for high magnification with which a narrower area is illuminated.

In the arrangements shown in FIGS. 2A and 2B, the image of the light source S by the first group $L_1$ and the focal point on the light source side of the fourth group $L_4$ are always coincident with each other at the middle point M between the second and third groups $L_2$ and $L_3$. The powers of the second and third groups $L_2$ and $L_3$ are predetermined in the following manner:

In the position for low magnification shown in 2A, the image point I given by the second group regarding the middle point M as the object point of the second group $L_2$ corresponds to the object point of the third group $L_3$, the image point of which is coincident with the middle point M. In the position for high magnification shown in 2B, the image point I given by the third group regarding the middle point M as the object point of the third group corresponds to the object point of the second group $L_2$, whose image point is coincident with the middle point M.

The second and third groups $L_2$ and $L_3$ hold the following relations therebetween:

$$1/-\frac{D}{2}+\frac{1}{b}=\frac{1}{f_2} \quad (1)$$

$$\frac{1}{D-b}+1/-\frac{D}{2}=\frac{1}{f_3} \quad (2)$$

wherein, $f_2$ is the focal length of the second group $L_2$;
$f_3$ is the focal length of the third group $L_3$;
D is the distance between the groups $L_2$ and $L_3$; and
b is the distance between the second group $L_2$ and the light source image I.

Let $\beta'$ denote the variable power rate between high magnification and low magnification and $\beta'=\beta^2$. Then, from the above equations (1) and (2), $$\beta = \frac{D-b}{b} . \quad (3)$$

Further, from (1), (2) and (3), $$f_2 = \frac{D}{\beta - 1} \quad (4)$$

$$f_3 = -\frac{D\beta}{\beta - 1} \quad (5)$$

$$b = \frac{D}{\beta + 1} . \quad (6)$$

The distance b between the second group $L_2$ and the light source image I remains unchanged even after the interchange of the position between the second and third groups $L_2$ and $L_3$. Let $\alpha_1$ denote the angle formed between the optical axis and the beam incident on the interchangeable second and third groups $L_2$ and $L_3$, $\alpha_2$ the divergent angle of the exit beam at low magnification and $\alpha_2'$ that at high magnification as seen in FIGS. 2A and 2B. Then, $\beta = \tan \alpha_2/\tan \alpha_1$ and $1/\beta = \tan \alpha_2'/\tan \alpha_1$. Therefore, the illuminated view field at high magnification $\phi_H$, and the illuminated view field at low magnification $\phi_L$, are given by:

$$\phi_H = (f_4/\beta) \cdot \tan \alpha_1$$

and $$\phi_L = f_4 \beta \cdot \tan \alpha_1$$

wherein, $f_4$ is the focal length of the fourth group $L_4$.

Assuming that there exist conjugate points (C, C') which remain unchanged by the above interchange of position between the second and third groups $L_2$ and $L_3$ and that the distance from the second and third groups to the conjugate points (C, C') is $l$ and the distance from the second group $L_2$ to the image point of the conjugate point C by the second group $L_2$ is $b'$, there may be obtained the following equations:

$$1/l + 1/b' = 1/f_2 \qquad (7)$$

$$1/(D-b') + 1/l = 1/f_3 \qquad (8)$$

Solving the equations regarding $l$ using the above equations (4) and (5) gives:

$$(-2D)l^2 + \{D^2(4\beta - \beta^2 - 1)/(\beta - 1)^2\}l + D^3\beta/(\beta - 1)^2 = 0$$

Rearrangement with replacements of $A = -2D$, $B = D^2(4\beta - \beta^2 - 1)/(\beta - 1)^2$ and $C = D^3\beta/(\beta - 1)^2$ gives:

$$l = (-B \pm \sqrt{B^2 - 4AC})/2A \qquad (9)$$

Substituting the above equations (4) and (5) for $f_2$ and $f_3$ in (7) and (8) respectively, it is found that $B^2 - 4AC > 0$. Therefore, the equation (9) has real solutions, which proves that there really exist two pairs of conjugate points which remain unchanged even by the interchange of position between the second and third groups $L_2$ and $L_3$. The solutions obtained from the equation (9) have different signs, (+) and (−). The solution with (+) corresponds to the middle reference point M between the second and third groups. The solution with (−) corresponds to another pair of conjugate points (C, C') existing outside of the second and third groups.

In the basic arrangement shown in FIGS. 2A and 2B, the first group $L_1$ is positioned at the conjugate point (C) on the side of the light source and the illuminated object surface is at the image point of the conjugate point on the object surface side by the fourth group $L_4$. By this arrangement it is made possible to use all of the rays transmitted through the first group $L_1$ as effective rays for illumination all the time. Even when the magnification is changed by the interchange of position between the second and third groups, there occurs no problem of excess or shortage of illumination light. The relative position of the image point I of the light source S to the second and third groups remains unchanged by changing the magnification. Therefore there may be provided a telecentric stop integrally with the second or third group in order to suitably control the illumination aperture according to the Güther's formula in measuring a cylindrical object, etc.

Figure 3A:
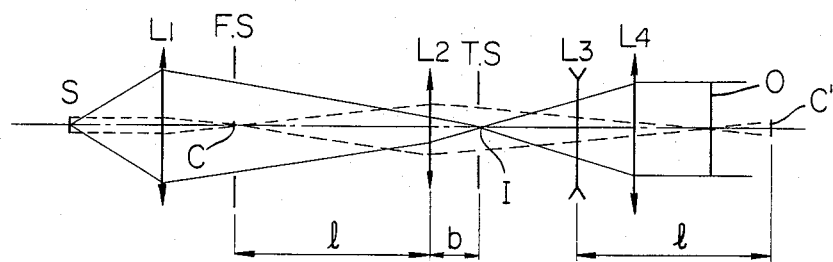
Figure 3B:
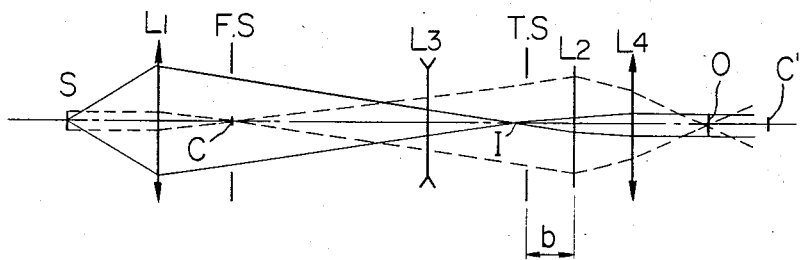

FIGS. 3A and 3B show another arrangement of the illumination system according to the invention. In this arrangement, a field stop FS is provided at the conjugate point (C) on the illumination source side and a telecentric stop TS, that is, an aperture stop is provided at the image point I of the light source S. Other parts of the arrangement shown in FIGS. 3A and 3B correspond to those of the arrangement shown in FIGS. 2A and 2B.

In the arrangement as shown in FIG. 3A and 3B, the illumination aperture is reverse-proportional to the size of the illuminated field. For low magnification at which the illuminated field is relatively large, the illumination aperture becomes small and for high magnification at which the illuminated field is relatively small, the illumination aperture becomes large. Generally, the aperture of an objective lens becomes smaller toward lower magnification and becomes larger toward higher magnification. Therefore, the use of the arrangement according to the invention has the advantage that the amount of aperture control necessary for an objective lens with high magnification as well as the amount of field control necessary for a high magnifying power objective lens can be substantially reduced as compared to the conventional arrangements thereby, attaining the more effective use of the beam of light for both of low magnification and high magnification. It is obvious that the stops may be omitted from the above shown arrangement in view of cost without losing the effect of the invention.

Figure 4A:
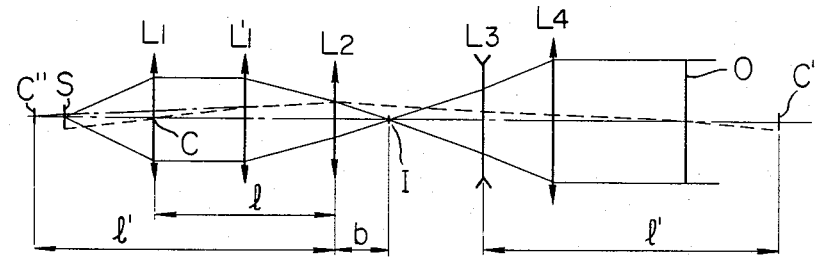
Figure 4B:
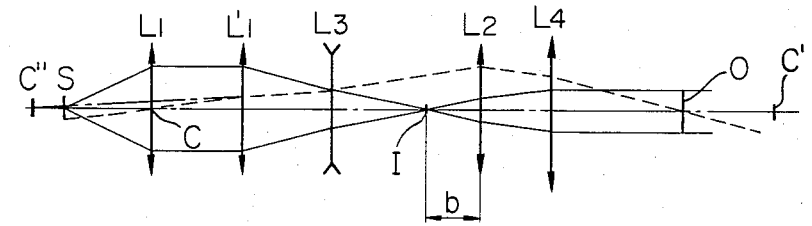

FIGS. 4A and 4B show a further arrangement of the telecentric illumination system according to the invention.

In this arrangement, an additional converging lens $L_1'$ is provided between the conjugate point (C) and the second group $L_2$ or the third group $L_3$ (as described above and shown in A and B, the second and third groups $L_2$ and $L_3$ are interchangeable in position). The additional converging lens $L_1'$ is so disposed that an image of the light source is formed at the middle point M by the first group $L_1$ and the converging lens $L_1'$ and the conjugate point (C) lies at the inside of the focal point on the light source side of the converging lens $L_1'$. The use of such additional converging lens $L_1'$ has the advantage that the apparent distance $l'$ between the conjugate point C and the second group (in the case of A) or the third group (in the case of B), that is, the distance between the image point C'' of the conjugate point C by the converging lens $L_1'$ and the second or third group can be made longer than the real distance $l$. This makes it possible to obtain a larger distance between the fourth group and the illuminated object surface O, namely a larger working distance. The reason for this is that since the object plane O is disposed substantially coincident with the image point of the object side conjugate point C' of the interchangeable lens group by the fourth group, increasing the distance from the interchangeable lens group to the conjugate point C or C' is equivalent to increasing the distance to the object plane O. If a larger distance $l$ is desired in the arrangement shown in FIGS. 2A, 2B as 3A, 3B without such additional converging lens $L_1'$, it may be attained only by making the total length of the illumination system too long to be practically acceptable. In contrast, according to the arrangement shown in FIGS. 4A and 4B, a longer working distance can be obtained without increasing the whole length of the illumination system so much.

The following table shows a concrete embodiment of the basic arrangement shown in FIGS. 2A, 2B and 3A, 3B as numerical data of power shares of the groups $L_1$, $L_2$, $L_3$ and $L_4$. In the table, $f_1$, $f_2$, $f_3$ and $f_4$ are focal length of the groups respectively.

---

Variable power ratio: 4
$L_1: f_1 = 25$

-continued

| | |
|---|---|
| $L_2:f_2 = 50$ | |
| $L_3:f_3 = -100$ | |
| $L_4:f_4 = 75$ | |
| Distance between light source and $L_1$ | 31.25 |
| Distance between $L_1$ and $L_2$ | 100 |
| Distance between $L_2$ and $L_3$ | 50 |
| Distance between $L_3$ and $L_4$ | 75 |
| Distance from $L_2$, $L_3$ to the outside conjugate point | 100 |
| Spacing between $L_2$ and telecentric stop | 16.67 |
| Distance between $L_4$ and the illuminated object | 30 |

Figure 5A:
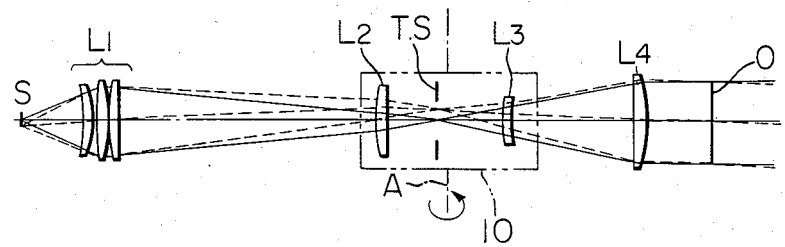
FIGS. 5A and 5B show the optical path of an embodiment of the invention in which again A is for low magnification and B is for high magnification.
Figure 5B:
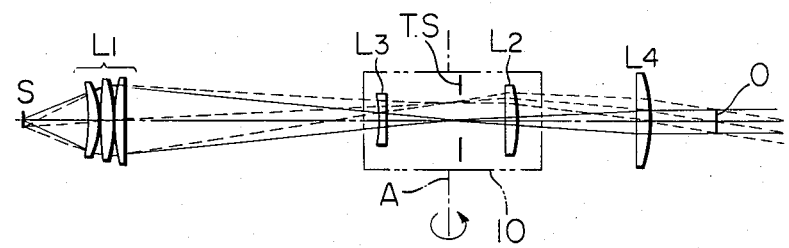

FIGS. 5A and 5B illustrate the optical path of the above embodiment and showing the the lenses in more detail. FIG. 5A shows the position for illumination at a lower magnification in which a broader area is illuminated. FIG. 5B shows the position for illumination at a higher magnification in which a narrower area is illuminated.

As shown, a telecentric stop TS is disposed at the position of the light source image between the converging second group $L_2$ consisting of a positive lens and the diverging third group $L_3$ consisting of a negative lens. The second and third groups $L_2$ and $L_3$ and the telecentric stop TS are received in a lens tube 10 so as to form a unit. The lens tube 10 is rotatable about an axis A containing the middle point between the second and third groups $L_2$ and $L_3$. Therefore, the positions of the second and third groups $L_2$ and $L_3$ in the optical path can be interchanged by rotating the lens tube 10 about the axis A. At the interchange of position between the second and third groups, the relative position of the telecentric stop TS to the second and third groups remains unchanged. In this manner, the illumination system can be changed from illumination with low magnification to illumination with high magnification and vice versa in a very simple manner while maintaining the condition of telecentric illumination and without any problem of excess or shortage of effective light for illumination.

As readily understood from the foregoing, the illumination system of the invention has many advantages over the prior art.

According to the invention, the beam of light from a light source can be used more effectively for illumination in both of the position for illumination with low magnification and the position for illumination with high magnification. Therefore, good performance of telecentric illumination is always obtained. When the illumination system of the invention is applied to a measuring projection, which is usually used in a relatively bright room, the examiner can obtain a bright view field for observation even with a high magnifying power lens. Thereby the operability of the examining apparatus can be improved to a great extent.

In addition, according to the invention, a telecentric stop can be incorporated into a telecentric illumination system. This makes it possible to suitably control the aperture by the telecentric stop according to Günther's formula in examining an object in a cylindrical form or other similar forms. Furthermore, by providing a field stop at the conjugate point on the light source side in addition to the above telecentric stop, it is possible to control both of the view field and the aperture. It is obvious that only with slight modification the illumination system according to the invention may be used also as a magnification variable Köhler illumination system for common microscopes.

While the invention has been particularly shown and described with reference to preferred embodiments thereof. It will be understood by those skilled in the art that the foregoing and other changes in form and details can be made therein without departing from the spirit and scope of the invention.

I claim:

1. A telecentric variable power illumination system comprising:
   a light source;
   a converging first unit for forming an image of said light source;
   a converging second unit disposed between said converging first unit and an object surface to be illuminated;
   a diverging third unit disposed between said converging first unit and the object surface;
   a converging fourth unit disposed between said divergent third unit and the object surface, said converging fourth unit having a focal point coincident with the position of the light source image formed by said converging first unit;
   said light source image by said converging first unit being formed between said converging second unit and said diverging third unit,
   the converging second unit and the diverging third unit being interchangeable in position with each other; and
   means for reversibly interchanging the positions of said converging second unit and said diverging third unit while maintaining the telecentricity and while maintaining said light source image between said converging second unit and said diverging third unit.

2. A telecentric variable power illumination system as set forth in claim 1, wherein the composite system consisting of said first and second units forms an image of said light source between said second and third units and the focal point on the light source side of the composite system consisting of said third and fourth units is coincident with said light source image, whereas when said second and third units are interchanged in position, the composite system consisting of the first and third units forms an image of said light source between said second and third units and the focal point on the light source side of the composite system consisting of the second and fourth units is coincident with said light source image.

3. A telecentric variable power illumination system as set forth in claim 2, wherein said converging first unit forms said light source image at the middle point between said second and third units and the focal point on the light source side of the converging fourth unit is always coincident with said middle point between said second and third units.

4. A telecentric variable power illumination system as set forth in claim 3, wherein said illumination system satisfies the following relations:

$$f_2 = \frac{D}{\beta - 1}$$

$$f_3 = \frac{D}{\beta - 1} \text{ and}$$

$$b = \frac{D}{\beta + 1}$$

wherein $f_2$ is the focal length of the second unit;
$f_3$ is the focal length of the third unit;
D is the distance between said second and third units;
b is the distance between the light and source image and the second unit; and
$\beta^2$ is the variable power rate of said variable power illumination system.

5. A telecentric variable power illumination as set forth in claim 4, which further comprises a field stop means disposed at the conjugate point with the illuminated object surface relative to said second unit, third unit and fourth unit.

6. A telecentric variable power illumination system as set forth in claim 4, wherein said interchanging means comprises a rotary barrel for supporting said second and third units rotatably relative to the middle point between said two units.

7. A telecentric variable power illumination system as set forth in claim 6, wherein said rotary barrel has a telecentric stop discussed between said second and third units.

8. A telecentric variable power illumination system as set forth in claim 7, which is represented by the following data of the first, second, third and fourth units $L_1$, $L_2$, $L_3$ and $L_4$ and their focal lengths $f_1$, $f_2$, $f_3$ and $f_4$:

| | |
|---|---|
| Variable power ratio | 4 |
| $L_1$ | $f_1 = 25$ |
| $L_2$ | $f_2 = 50$ |
| $L_3$ | $f_3 = -100$ |
| $L_4$ | $f_4 = 75$ |
| Distance between light source and $L_2$ | 31.25 |
| Distance between $L_1$ and $L_2$ | 100 |
| Distance between $L_2$ and $L_3$ | 50 |
| Distance between $L_3$ and $L_4$ | 75 |
| Distance from $L_2$, $L_3$ to the outside conjugate point | 100 |
| Spacing between $L_2$ and telecentric stop | 16.67 |
| Distance between $L_4$ and the illuminated object | 30 |

9. A telecentric variable power illumination system for supplying a light beam from a light source to an object surface and for maintaining good illumination efficiency even when the magnification is changed, comprising:
 a converging lens unit for forming an image of said light source at a predetermined position;
 another converging lens unit disposed at the object side of said light source image, the light source side focal point of said another converging lens unit being coincident with the position of said light source image;
 interchangeable lens means disposed between said converging lens unit and said another converging lens unit and including a further converging lens unit and a diverging lens unit, said light source image being disposed between said further converging lens unit and said diverging lens unit, and said further converging lens unit and said diverging lens unit being interchangeable in position with each other; and
 means for reversibly interchanging the positions of said further converging lens unit and said diverging lens unit while maintaining said light source image between said further converging lens unit and said diverging lens unit.

10. A telecentric variable power illumination system according to claim 9, wherein said interchanging means has a rotatable lens barrel for supporting said further converging lens unit and said diverging lens unit rotatably relative to the middle point between said further converging lens unit and said diverging lens unit, and a telecentric stop disposed between said further converging lens unit and said diverging lens unit.

* * * * *